US009785696B1

(12) United States Patent
Yakhnenko et al.

(10) Patent No.: US 9,785,696 B1
(45) Date of Patent: Oct. 10, 2017

(54) AUTOMATIC DISCOVERY OF NEW ENTITIES USING GRAPH RECONCILIATION

(71) Applicant: GOOGLE INC., Mountain View, CA (US)

(72) Inventors: Oksana Yakhnenko, New York, NY (US); Norases Vesdapunt, Stanford, CA (US)

(73) Assignee: GOOGLE INC., Mountain View, CA (US)

(*) Notice: Subject to any disclaimer, the term of this patent is extended or adjusted under 35 U.S.C. 154(b) by 580 days.

(21) Appl. No.: 14/059,830

(22) Filed: Oct. 22, 2013

Related U.S. Application Data

(60) Provisional application No. 61/887,142, filed on Oct. 4, 2013.

(51) Int. Cl.
*G06F 17/30* (2006.01)

(52) U.S. Cl.
CPC .. *G06F 17/30598* (2013.01); *G06F 17/30604* (2013.01); *G06F 17/30958* (2013.01)

(58) Field of Classification Search
None
See application file for complete search history.

(56) References Cited

U.S. PATENT DOCUMENTS

| 7,502,770 | B2 | 3/2009 | Hillis et al. |
| 7,587,387 | B2 | 9/2009 | Hogue |
| 7,765,206 | B2 | 7/2010 | Hillis et al. |
| 7,769,579 | B2 | 8/2010 | Zhao et al. |
| 7,774,328 | B2 | 8/2010 | Hogue et al. |
| 7,792,837 | B1 | 9/2010 | Zhao |
| 7,925,610 | B2 | 4/2011 | Elbaz et al. |
| 7,966,291 | B1* | 6/2011 | Petrovic ............ G06F 17/30864 345/629 |
| 8,122,026 | B1 | 2/2012 | Laroco et al. |
| 8,204,856 | B2 | 6/2012 | Meyer et al. |
| 8,370,355 | B2 | 2/2013 | Harger et al. |
| 2007/0198600 | A1* | 8/2007 | Betz ................. G06F 17/30533 |
| 2008/0010291 | A1* | 1/2008 | Poola ................. G06F 17/3071 |
| 2009/0216708 | A1* | 8/2009 | Madaan ............. G06F 17/3071 |

(Continued)

FOREIGN PATENT DOCUMENTS

WO 2010085523 A1 7/2010

*Primary Examiner* — James Trujillo
*Assistant Examiner* — Aida Tessema
(74) *Attorney, Agent, or Firm* — Brake Hughes Bellermann LLP

(57) ABSTRACT

Systems and methods can identify potential entities from facts generated from web-based sources. For example, a method may include generating a source data graph for a potential entity from a text document in which the potential entity is identified. The source data graph represents the potential entity and facts about the potential entity from the text document. The method may also include clustering a plurality of source data graphs, each for a different text document, by entity name and type, wherein at least one cluster includes the potential entity. The method may also include verifying the potential entity using the cluster by corroborating at least a quantity of determinative facts about the potential entity and storing the potential entity and the facts about the potential entity, wherein each stored fact has at least one associated text document.

24 Claims, 9 Drawing Sheets

(56) References Cited

U.S. PATENT DOCUMENTS

| | | | |
|---|---|---|---|
| 2010/0121839 A1 | 5/2010 | Meyer et al. | |
| 2011/0173189 A1* | 7/2011 | Singh | G06F 17/30958 707/722 |
| 2011/0173197 A1* | 7/2011 | Mehta | G06F 17/30864 707/737 |
| 2013/0006935 A1* | 1/2013 | Grisby | G06F 17/30563 707/635 |
| 2013/0212081 A1* | 8/2013 | Shenoy | G06F 17/30864 707/706 |
| 2013/0238623 A1* | 9/2013 | Wyllie | G06F 17/30303 707/737 |
| 2014/0089334 A1* | 3/2014 | Adibi | G06Q 50/01 707/758 |
| 2014/0122422 A1* | 5/2014 | Tzadikevitch | G06F 17/30076 707/610 |
| 2015/0006587 A1* | 1/2015 | Segaran | G06F 17/30303 707/798 |

\* cited by examiner

AUTOMATIC DISCOVERY OF NEW ENTITIES USING GRAPH RECONCILIATION

RELATED APPLICATIONS

This application claims priority under 35 U.S.C. §119 to Provisional Patent Application Ser. No. 61/887,142, entitled "AUTOMATIC DISCOVERY OF NEW ENTITIES USING GRAPH RECONCILIATION" filed on Oct. 4, 2013. The subject matter of this earlier filed application is hereby incorporated by reference.

BACKGROUND

Large data graphs store data and rules that describe knowledge about the data in a form that provides for deductive reasoning. For example, in a data graph, entities, such as people, places, things, concepts, etc., may be stored as nodes and the edges between nodes may indicate the relationship between the nodes. In such a data graph, the nodes "Maryland" and "United States" may be linked by the edges of in country and/or has state. The basic unit of such a data graph can be a tuple that includes two entities, a subject entity and an object entity, and a relationship between the entities. Tuples may represent a real-world fact, such as "Maryland is a state in the United States." The tuple may also include other information, such as context information, statistical information, audit information, metadata about the edges, etc. However, the graph may be lacking information about some entities. These entities may be described in document sources, such as web pages, but adding the information for the entities manually is slow and does not scale. Such missing entities and their relationships to other entities reduce the usefulness of querying the data graph.

SUMMARY

Some implementations identify potential entities from facts generated from web-based sources. Facts from a particular source are analyzed and cleaned, generating a small source data graph that includes entities and facts from the source. The source graph may be generated for a potential source entity that does not have a matching entity in the target data graph. The system may repeat the analysis and generation of source data graphs for many source documents, generating many source graphs, each for a particular source document. The system may cluster the source data graphs together by type of source entity and source entity name. The entity name may be a string extracted from the text of the source. Thus, the system generates clusters of source data graphs of the same source entity name and type. The system may split a cluster of source graphs into buckets based on the object entity of one of the relationships, or predicates. The system may use a predicate that is determinative for splitting the cluster. A determinative predicate generally has a unique value, e.g., object entity, for a particular entity. The system may repeat the dividing a predetermined number of times, for example using two or three different determinative predicates, splitting the buckets into smaller buckets. When the iteration is complete, graphs in the same bucket share two or three common facts. The system may discard buckets without sufficient reliability and discard any conflicting facts from graphs in the same bucket. The system may merge the graphs in the remaining buckets, and use the merged graphs to suggest new entities and new facts for the entities for inclusion in a target data graph.

In one aspect, a computer system includes at least one processor and memory storing a target data graph and a plurality of source data graphs generated from analysis of source documents. Each source data graph is associated with a source document, has a source entity with an entity type that exists in the target data graph, and includes fact tuples. The fact tuples identify a subject entity, a relationship connecting the subject entity to an object entity, and the object entity. The relationship is associated with the entity type of the subject entity in the target data graph. The computer system also includes instructions that, when executed by the at least one processor, cause the computer system to perform operations that include generating a cluster of source data graphs, the cluster including source data graphs associated with a first source entity of a first source entity type that share at least two fact tuples that have the first source entity as the subject entity and a determinative relationship as the relationship connecting the subject entity to the object entity. The operations also include generating a reconciled graph by merging the source data graphs in the cluster when the source data graphs meet a similarity threshold, and generating a suggested new entity and entity relationships for the target data graph based on the reconciled graph.

These and other aspects can include one or more of the following features. For example, generating the cluster can include generating a first bucket for source data graphs associated with the first source entities and the first source entity type, splitting the first bucket into second buckets based on a first fact tuple, the first fact tuple having the first source entity as the subject entity and a first determinative relationship, so that source data graphs sharing the first fact tuple are in a same second bucket; and generating final buckets by repeating the splitting a quantity of times, each iteration using another fact tuple for the first source entity that represents a distinct determinative relationship, so that source data graphs sharing the first fact tuple and the other fact tuples are in a same final bucket, wherein the cluster is one of the final buckets.

As another example, generating the cluster may include generating a first bucket for source data graphs associated with the first source entities and the first source entity type, splitting the first bucket into second buckets based on the object entity related to the first subject entity by a first determinative relationship, so that source data graphs sharing object entities for the first relationship are in a same second bucket, discarding second buckets that do not meet a reliability threshold, and iterating the splitting and discarding for a quantity of iterations, each iteration using a different determinative relationship, wherein the cluster is one of the buckets generated by a final iteration that was not discarded. In such an implementation, the source documents may be documents associated with domain names and a particular bucket fails to meet the reliability threshold when the bucket includes fact tuples only from one domain and/or a particular bucket fails to meet the reliability threshold when the bucket includes one source data graph.

In another example, the similarity threshold is based on a quantity of fact tuples for a first source data graph in the cluster that match fact tuples for a second source data graph in the cluster. In some implementations, the reconciled graph is a first reconciled graph and the memory stores instructions that, when executed by the at least one processor, causes the computer system to further perform operations including generating a second reconciled graph from a second cluster for source data graphs associated with second subject entities of a second source entity type that share an entity name and that share object entities for at least two determinative relationships, determining that the first source entity type and the second source entity type are the same and that the first reconciled graph and the second reconciled graph meet the similarity threshold, and generating a third reconciled graph by merging the first reconciled graph and the second reconciled graph, wherein the suggested new entity and entity relationships are based on the third reconciled graph.

In some implementations, the memory stores instructions that, when executed by the at least one processor, causes the computer system to further perform operations including discarding fact tuples representing conflicting facts from a particular source data graph prior to generating the cluster and/or generating inverse fact tuples for a particular source data graph prior to generating the cluster, the inverse fact tuples being a subset of the fact tuples included in the particular source data graph.

In another aspect, a computer-implemented method includes generating, using at least one processor, a plurality of source data graphs, each source data graph being associated with a source document and a source entity, the source data graph including tuples for the source entity, each tuple having a predicate linking the source entity to an object entity. The method further includes clustering, using the at least one processor, source data graphs by source entity name and source entity type, dividing, using the at least one processor, the cluster into buckets, where each bucket includes source data graphs that share the source entity name and source entity type and at least two tuples that have a determinative relationship, and generating a candidate entity from at least some of the buckets, the candidate entity being from a first bucket that meets a reliability threshold.

These and other aspects can include one or more of the following features. For example, dividing the cluster into buckets can include selecting a determinative predicate from the tuples in the cluster, generating a bucket for unique objects for the determinative predicate, so that source data graphs with a first object for the determinative predicate are placed in a first bucket and source data graphs with a second object for the determinative predicate are placed in a second bucket, and repeating the selecting and generating on the generated buckets a quantity of times. As another example, dividing the cluster into buckets can include discarding buckets that do not meet the reliability threshold prior to repeating the selecting and generating. In some implementations, the source documents are documents associated with domain names, and a particular bucket fails to meet the reliability threshold when a quantity of unique domain names associated with the particular bucket fails to meet a threshold quantity and/or a particular bucket fails to meet the reliability threshold when a quantity of source data graphs in the particular bucket fails to meet a threshold quantity.

As another example, after the dividing, for each bucket not discarded, the method may further comprise generating a reconciled graph from source data graphs in the bucket; and generating the candidate entity using the reconciled graph. In some implementations, the method may also include determining that a first source entity type of a first reconciled graph and a second source entity type of a second reconciled graph are the same and that the first reconciled graph and the second reconciled graph meet a similarity threshold and generating a third reconciled graph by merging the first reconciled graph and the second reconciled graph, wherein the candidate entity is based on the third reconciled graph. In some implementations, the method may also include discarding fact tuples representing conflicting facts from the reconciled graphs prior to generating the candidate entity and/or generating inverse fact tuples for a particular source data graph prior to generating the cluster, the inverse fact tuples being a subset of the fact tuples included in the particular source data graph.

In another aspect, a method of automatically identifying new entities for a data graph includes generating a source data graph for a potential entity from a text document in which the potential entity is identified, the source data graph representing the potential entity and facts about the potential entity from the text document and clustering source data graphs by entity name and type, wherein at least one cluster is for the potential entity. The method may also include verifying the potential entity using the cluster by corroborating at least a quantity of determinative facts about the potential entity and storing the potential entity and the facts about the potential entity, wherein each stored fact has at least one associated text document. In some implementations, the quantity is three.

These and other aspects can include one or more of the following features. For example, the method may also include generating information that is presented to a user using the stored potential entity and the stored facts, receiving input from the user indicating the potential entity and the stored facts are acceptable, generating a new entity in a target data graph representing the potential entity, and generating relationships in the target data graph for the new entity that represent the stored facts. In some implementations, the method may include determining that the stored potential entity exists in the target data graph, determining stored facts that do not exist in the target data graph, and generating relationships in the target data graph for the stored facts that do not exist.

As another example, verifying the potential entity using the cluster can include iteratively dividing the source data graphs in the cluster into buckets, each division being based on a particular determinative fact, and each bucket including source data graphs sharing a quantity of determinative facts, where the quantity is equal to the iteration, wherein the potential entity is verified when it is included in a bucket after iteratively dividing the source data graphs. In such an implementation, buckets failing to meet a reliability threshold are discarded during the iterative dividing.

In some implementations, a determinative fact includes a predicate that represents a one-to-one relationship between the potential entity and an object entity and in some implementations a determinative fact is determined based on predicate metadata for a target data graph. In some implementations, the method may include removing conflicting facts from the facts about the potential entity prior to storing the potential entity and the facts. In some implementations, the potential entity is verified when each of the quantity of determinative facts is associated with the quantity of distinct text documents.

In one general aspect, a computer program product embodied on a non-transitory computer-readable storage device includes instructions that, when executed by at least one processor, cause a computing device to perform any of the disclosed methods, operations, or processes. In another general aspect, implementations include a system and/or method for identifying and defining a potential new entity and facts about the new entity using graph reconciliation, substantially as shown in and/or described in connection with at least one of the figures, as set forth more completely in the claims.

One or more of the implementations of the subject matter described herein can be implemented so as to realize one or more of the following advantages. As one example, implementations may help extend a data graph more quickly by identifying entities in documents and facts concerning the entities. The entities and facts may be of high quality due to the corroborative nature of the graph reconciliation process. The identified entities may be identified from news sources, to more quickly identify new entities to be added to the data graph. The system may identify the potential new entities and their facts from thousands or hundreds of thousands of sources, providing potential entities on a scale that is not possible with manual evaluation of documents. Entities and facts added to the data graph can be used to provide more complete or accurate search results.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
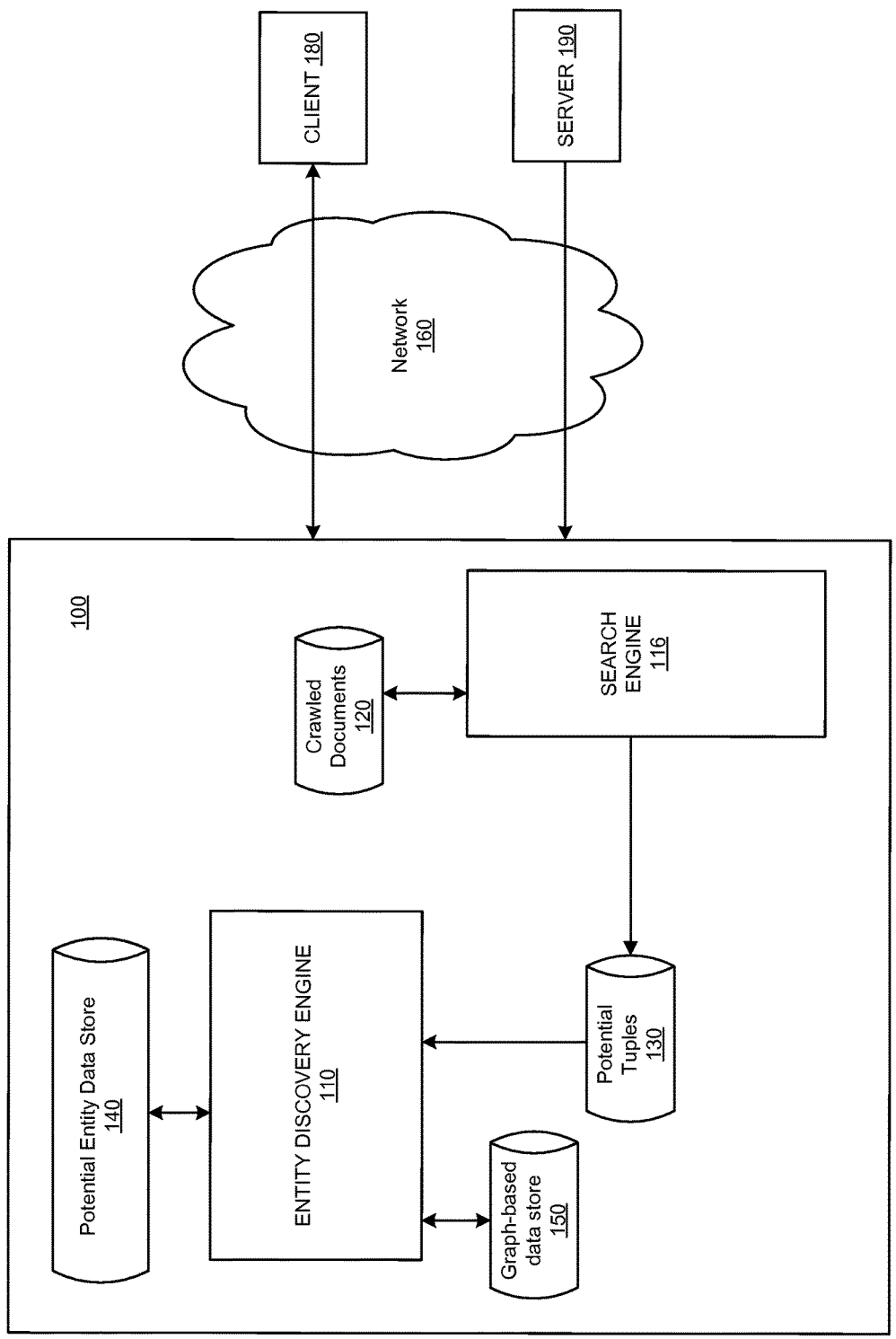
FIG. 1 illustrates an example system in accordance with the disclosed subject matter.

FIG. 1 is a block diagram of an entity discovery system in accordance with an example implementation. The system 100 may be used to determine potential entities missing from a large graph-based data store, along with facts about the potential entities. A fact for an entity is an object related to the entity by a predicate. A fact for a particular entity may thus be described or represented as a predicate/object pair. The facts may be determined from parsed text documents. The depiction of system 100 in FIG. 1 is described as a system generating potential entities using documents available over the Internet. However, other configurations and applications may be used. For example, the documents may originate from another document corpus, such as internal documents not available over the Internet or another private corpus, from a library, from books, from a corpus of scientific data, or from some other large corpus.

Figure 8:
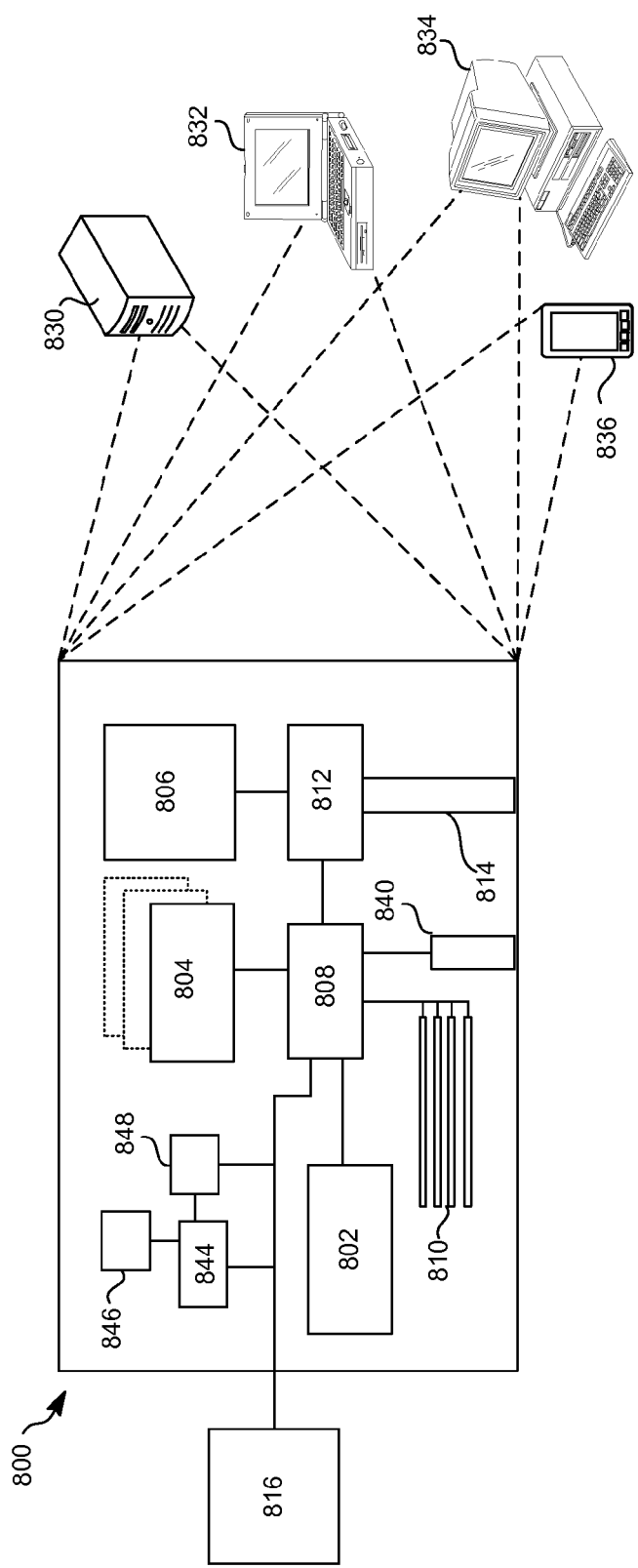
FIG. 8 shows an example of a computer device that can be used to implement the described techniques.
Figure 9:
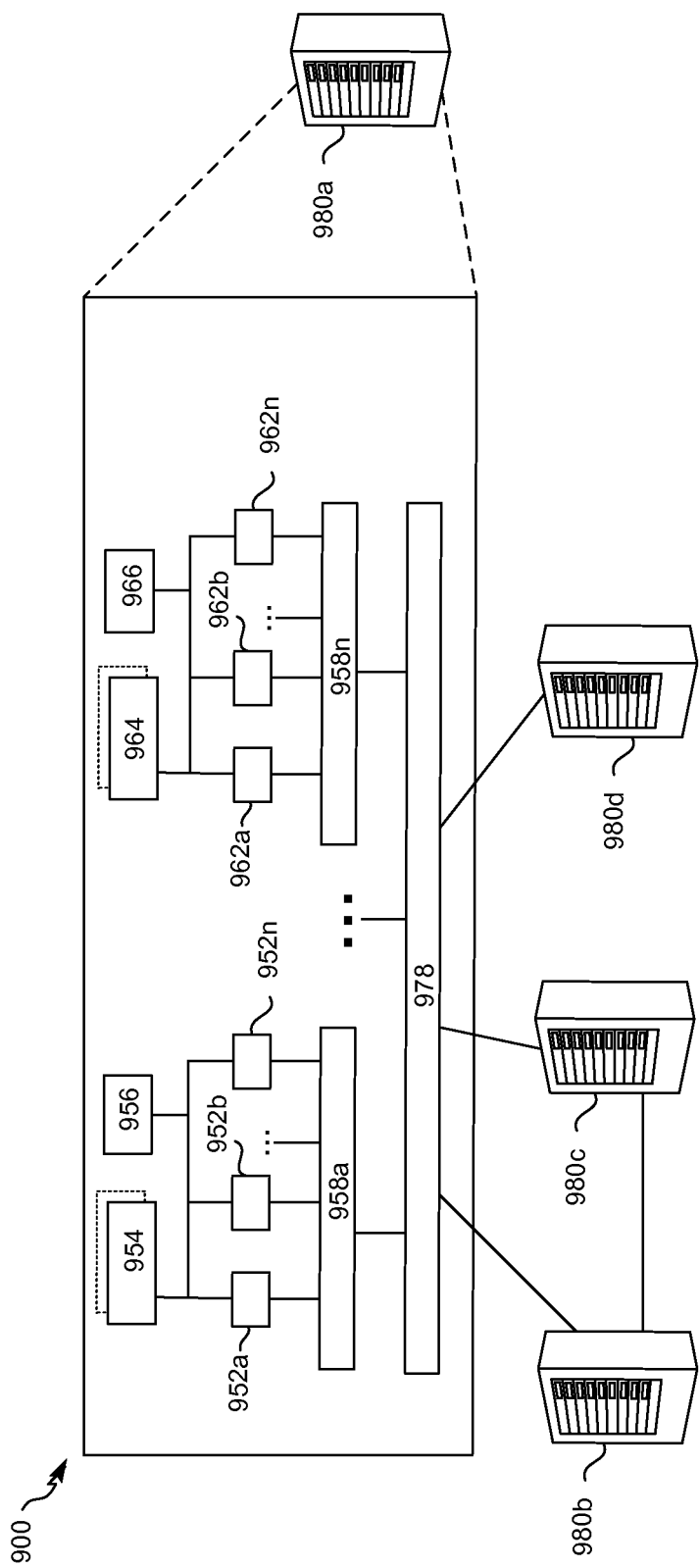
FIG. 9 shows an example of a distributed computer device that can be used to implement the described techniques.

The entity discovery system 100 may be a computing device or devices that take the form of a number of different devices, for example a standard server, a group of such servers, or a rack server system. In addition, system 100 may be implemented in a personal computer, for example a laptop computer. The entity discovery system 100 may be an example of computer device 800, as depicted in FIG. 8, or computer device 900, as depicted in FIG. 9.

The entity discovery system 100 may include a graph-based data store 150. The graph-based data store 150 can be a directed edge-labeled graph. Such a data graph stores nodes and edges. The nodes in the data graph represent an entity, such as a person, place, item, idea, topic, abstract concept, concrete element, other suitable thing, or any combination of these. Entities in the data graph may be related to each other by edges, which represent relationships between entities. For example, the data graph may have an entity that corresponds to the actor Charlton Heston and the data graph may have an acted in relationship between the Charlton Heston entity and entities representing movies that Charlton Heston has acted in. A data graph with a large number of entities and even a limited number of relationships may have billions of connections. In some implementations, graph-based data store 150 may be stored in an external storage device accessible from system 100. In some implementations, the graph-based data store 150 may be distributed across multiple storage devices and/or multiple computing devices, for example multiple servers. In some implementations, the relationships are represented by tuples. A tuple may include a subject entity, an object entity, and a predicate. The predicate represents the relationship and, thus, a relationship may be referred to as a predicate. Of course, a tuple may include additional information as well, such as the origins of the tuple, a score for the originating source, etc.

Although not shown in FIG. 1, the entity discovery system 100 can include one or more processors configured to execute one or more machine executable instructions or pieces of software, firmware, or a combination thereof. The entity discovery system 100 can also include an operating system and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100. The system 100 may include one or more engines, such as entity discovery engine 110 and search engine 116. The engines may be modules or may be computing devices with their own processors and memories.

The entity discovery engine 110 may find the largest common subgraph among a plurality of source graphs. The entity discovery engine 110 may generate the source graphs from potential tuples 130, which are derived from entities and facts determined from a source document of crawled documents 120. The system 100 may parse the crawled documents 120 to determine the potential tuples 130 using techniques such as relation extraction. The crawled documents 120 may be documents obtained using known or later developed web-crawling techniques, for example. In some implementations, the crawled documents 120 represent documents available over the Internet. In some implementations, the crawled documents 120 may be indexed in an index used by the document search engine 116. In some implementations, the crawled documents 120 may be tagged with entity identifiers to assist in the generation of potential tuples 130 as well as for other reasons.

The entity discovery engine 110 may use the information in the potential tuples 130 and the graph-based data store 150 to generate one or more potential entities. The potential entities may be stored in the potential entity data store 140 with the provenance and facts determined by the entity discovery engine 110. The provenance of a potential entity represents the source document or documents that the entity appears in. In other words, the source document associated with the potential tuples used to generate the potential entity. The potential entity data store 140 may also store facts for the potential entity. The facts may be represented by relationship/object pairs that are associated with the potential entity. In some implementations, at least one of the object entities in the tuples 130 for a particular potential entity must exist in the graph-based data store 150. This ensures that if the particular potential entity is added to the graph-based data store 150 it is linked to at least one existing entity. The potential entities and their facts in potential entity data store 140 may be verified by human raters and easily incorporated into the graph-based data store 150 because they are in a format already used by the target data store, graph-based data store 150.

The modules may also include search engine 116. The search engine 116 may include an indexer that crawls documents available from servers 190 and parses and indexes the content. The search engine 116 may also receive queries from clients 180 and access the crawled documents and/or the graph-based data store 150 to generate a search result for the query. In some implementations, the search engine 116 may also obtain query results from other sources and may combine the results from the graph-based data store 150 with the results from the crawled documents 120 and other sources.

Entity discovery system 100 may be in communication with clients 180 over network 160. Clients 180 may allow a user to verify and evaluate potential entities and the facts in the potential entity data store, to submit queries to the search engine 116, etc. Network 160 may be for example, the Internet, or the network 160 can be a wired or wireless local area network (LAN), wide area network (WAN), etc., implemented using, for example, gateway devices, bridges, switches, and/or so forth. Via the network 160, the entity discovery system 100 may communicate with and transmit data to/from clients 180. In some implementations, entity discovery system 100 may be in communication with or include other computing devices that provide updates to the graph-based data store 150 and to the crawled documents 120. For example, entity discovery system 100 may include or be in communication with an indexing engine that crawls web server(s) 190 for documents and indexes the contents of the documents. The entity discovery system 100 represents one example configuration and implementations may incorporate other configurations. For example, some implementations may combine one or more of the entity discovery engine 110 and the search engine 116 into a single module or engine. In some implementations, the entity discover engine 110 and the search engine 116 may share resources and, in some implementations, the entity discovery engine 110 and the search engine 116 may be separate computing devices.

Figure 2:
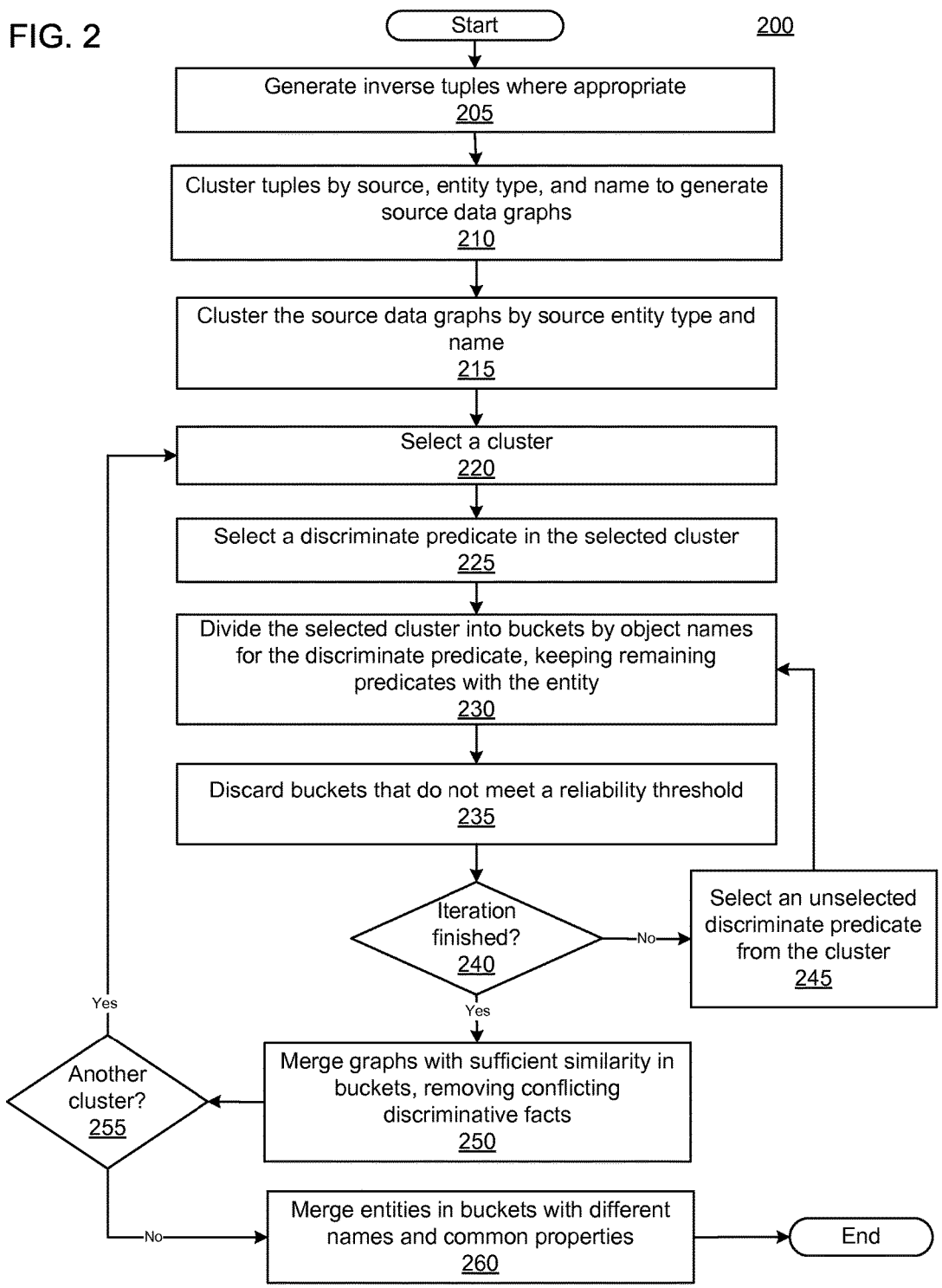
FIG. 2 illustrates a flow diagram of an example process for discovering new entities through graph reconciliation, in accordance with disclosed implementations.

FIG. 2 illustrates a flow diagram of an example process 200 for generating potential tuples for a target data graph from reconciled source data graphs. Process 200 may be performed by an entity discovery system, such as system 100 of FIG. 1. Before process 200 may begin, the system may analyze some of source documents, such as web pages associated with one or more domains, and extract entities and facts about the entities from the source documents using known or later developed techniques. The source documents may include any file with text, including web pages, PDF documents, word processing documents, presentation documents, database records, etc. The extracted entities and facts may be in the form of tuples, with at least a subject entity, a predicate or relationship, and an object entity. The tuples may be associated with a source document from which the tuples were extracted. The source document represents the provenance of the tuple. Each document with a different identifier, for example a different URL or a different file name, may be considered a different source. Documents from the same location or the same domain, e.g., foo.com, are considered related documents while documents from different domains are considered unrelated documents. In some implementations, the potential tuples may be tuples where the predicate exists as a valid predicate in the target data graph. In some implementations, the selected source documents can be documents updated or added since a previous time period. In some implementations, the documents may be documents that change with a threshold frequency, e.g., documents from news domains.

The system may begin by generating inverse tuples for the potential tuples, where appropriate (205). An inverse tuple reverses the subject and object entities. For example, if the potential tuples includes the tuple <Charlton Heston, acted in, Planet of the Apes> the system may generate an inverse tuple of <Planet of the Apes, has actor, Charlton Heston>. In some implementations, the system may generate inverse tuples for certain predicates and not others. For example, if the target data graph includes a certain percentage of inverse occurrences for a particular predicate, the system may generate the inverse tuple. However, if the particular predicate does not have the certain percentage of inverse occurrences in the target data graph, the system may not generate an inverse tuple. For instance tuples with a date or measurement as the object may not be good candidates for inverse occurrences, and may not have many inverse occurrences. For example, the tuple <Planet of the Apes, released, 2001> is not likely to have an inverse occurrence of <2001, is year of release, Planet of the Apes> in the target data graph. Thus, the system may not generate an inverse tuple when the potential tuple has the predicate released.

The system may then cluster the potential tuples by source, or provenance, subject entity type, and subject entity name to generate source data graphs (210). The name of the subject entity may be generated from an un-normalized text representation of the entity in the source document. The source entity type may be determined based on predicate metadata that is part of the target data graph. For example, the predicate metadata may include an indication of the source entity type and the object entity type expected for a predicate. Examples of entity types include person, place, date, animal, plant, sport, profession, thing, etc. The clustered tuples represent a source data graph. The source data graph includes one entity, referred to as a source entity, from one source document and the facts (e.g., predicate/object pairs) for the source entity from that source document. In some implementations, source data graphs that have a source entity of a date or measurement entity type may be discarded, as these are not particularly helpful in generating new entities for the target data graph. In some implementations, the system may determine whether at least one object entity from the source data graph exists in the target data graph. When at least one object entity exists in the target graph, the system can ensure that the source entity of the source data graph can be linked into the target data graph, if it is accepted as a new entity. In some implementations, the system may determine whether the source entity already exists in the target data graph and, if so, may drop the source data graph.

Figure 3:
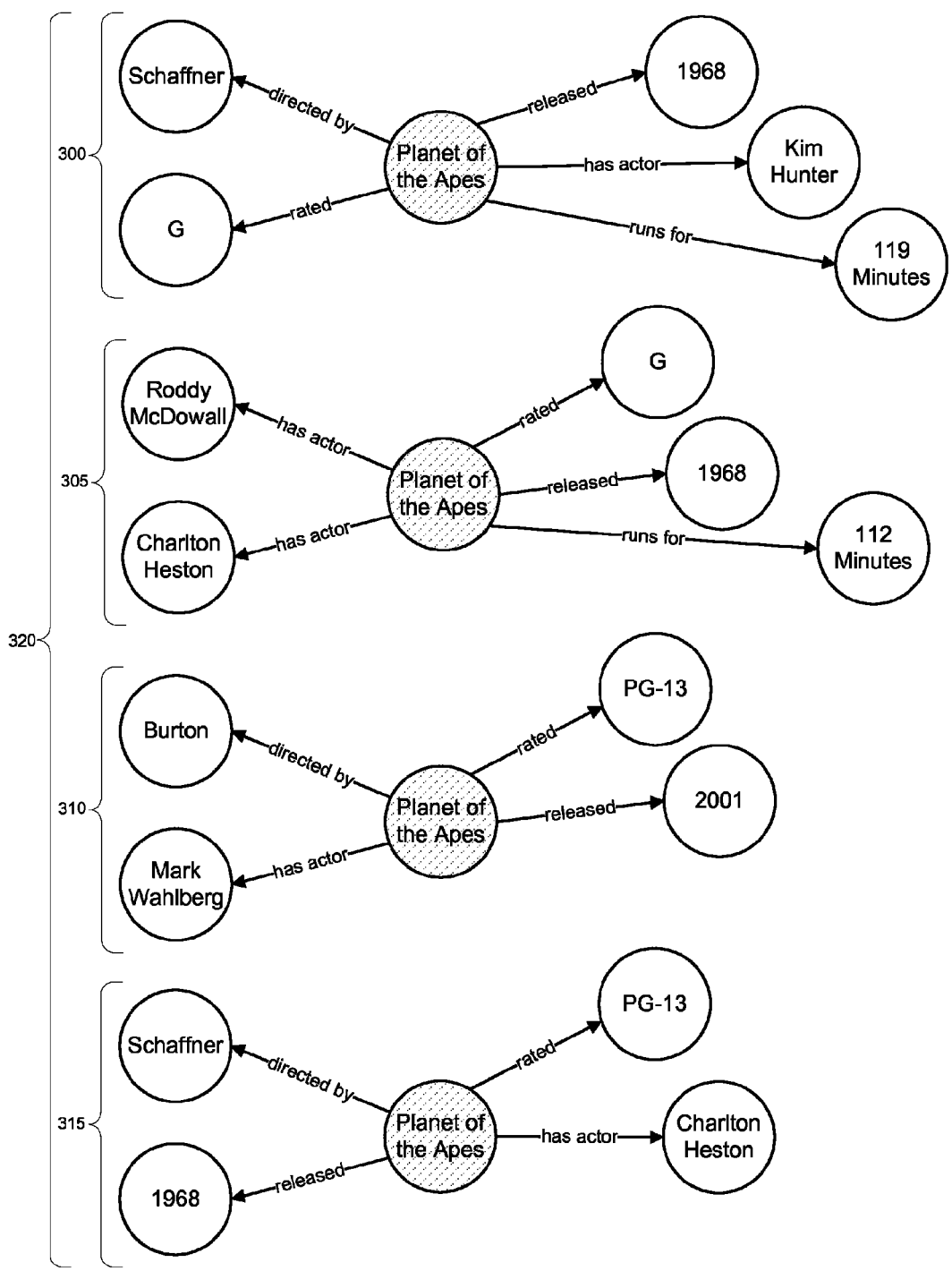
FIG. 3 illustrates an example of a cluster of source data graphs of the same entity type and entity name, in accordance with disclosed implementations.

Having generated a plurality of source data graphs, each source data graph representing potential tuples from a distinct source document, the system may cluster the source data graphs by source entity type and name (215). FIG. 3 illustrates an example of a cluster 320 of four source data graphs, 300, 305, 310, and 315. Source data graphs 300, 305, 310, and 315 were clustered together into cluster 320 because they share the same source entity type, Movie, and source entity name, "Planet of the Apes." Although illustrated with four source data graphs for the sake of brevity, it is understood that the cluster 320 may include tens or hundreds of source data graphs. It is also understood that the system may generate tens or hundreds of clusters from the source data graphs generated from potential tuples.

The system may iteratively split the clusters into subclusters or buckets. For example, the system may select a first cluster (220) and select a discriminate predicate from the first cluster (225). A discriminate predicate is a predicate with a one-to-one relationship between the subject and object entities. In other words, a discriminate predicate has a unique object for each subject entity. Examples of a discriminate predicate include birth date, runs for, has zip code, because a person has one birth date and a movie has one running time, etc. Examples of non-discriminate predicates include has siblings, has actor, has spouse, etc. In some implementations, the system may identify discriminate predicates based on predicate metadata from the target data graph. In some implementations, the system may select discriminate predicates in an order. The order may be lexicographical or based on a priority or importance signal for the predicate. The signals may be part of the predicate metadata for the target data graph. So long as the order is maintained throughout process 200 for every cluster, the system can avoid generating duplicate buckets.

Figure 4:
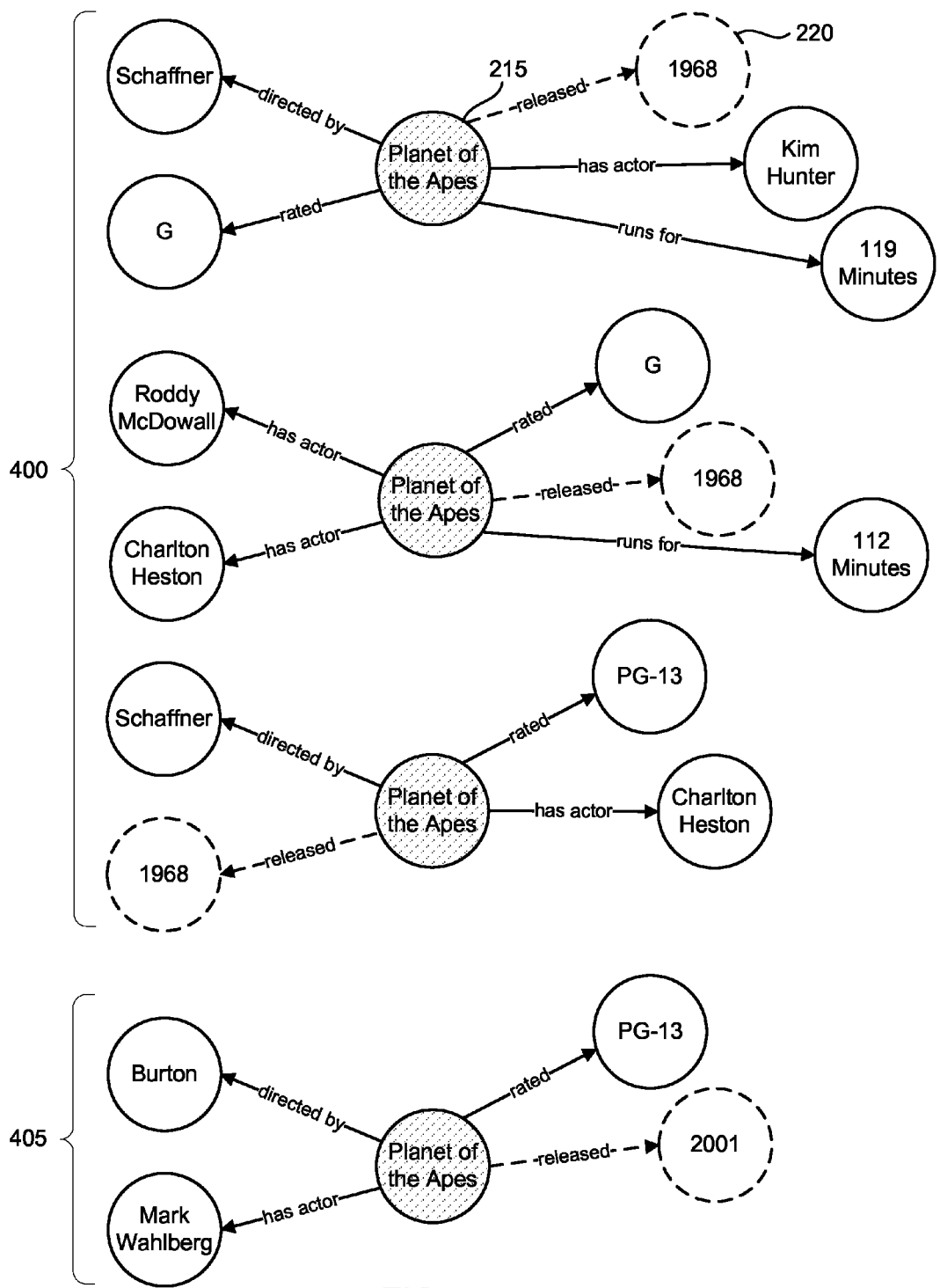
FIG. 4 illustrates splitting the cluster of source data graphs using a first determinative relationship, in accordance with disclosed implementations.

The system may divide the source data graphs of the first cluster into subclusters or buckets based on the object for the selected discriminate predicate (230). In other words, the system may place source data graphs with the same tuple for the discriminate predicate in the same bucket. FIG. 4 illustrates an example of splitting the cluster of FIG. 3 into two buckets based on the released discriminate predicate. Three of the source data graphs share a tuple for the released predicate, namely <Planet of the Apes, released, 1968>. These three source graphs are placed in bucket 400. One source data graph from FIG. 3 includes the tuple <Planet of the Apes, released, 2001>. This source data graph is placed in a separate bucket 405 because it has a different object entity than the three source data graphs in bucket 400. Thus, as illustrated, each bucket represents a distinct predict/object pair, or fact, for the selected discriminate predicate. The system may discard source data graphs lacking a tuple for the discriminate predicate.

The system may evaluate the buckets generated above and discard any buckets that do not meet a reliability threshold (235). For example, buckets with insufficient evidence may be discarded. A bucket that has less than a minimum number of source data graphs may have insufficient evidence. For example, bucket 405 of FIG. 4 may be discarded because it includes only one graph. Of course, the minimum number may be larger than one, and may depend on the number of source data graphs. Buckets with source data graphs from too few related sources may have insufficient evidence. For example, to ensure that the facts in the bucket are corroborated from unrelated sources, e.g., multiple domains, the system may discard buckets that represent too few domains. For example, if all three source data graphs in bucket 400 are from a single domain, the system may discard bucket 400, but may keep bucket 400 when the graphs represent more than one domain. This example from FIG. 4 is illustrative and it is understood that the number of domains represented by a bucket may be flexible, e.g., may be higher than two and may depend on the number of related sources represented by the potential tuples and adjusted by a system administrator.

The system may determine whether the bucket formation is finished (240). In some implementations, the system may iterate a predetermined quantity of times. The quantity represents the number of shared edges between source data graphs in final buckets. The more shared edges, the more likely that the reconciled graph generated from the bucket includes high-quality facts. However, the more shared edges required for a reconciled graph, the fewer such graphs the system will identify. In some implementations, the system may iterate three times, meaning that source data graphs with three shared discriminate edges are used to generate a reconciled data graph. In some implementations, the system may score the buckets and continue splitting buckets until a score for a parent bucket is better than the maximum score of any of its children, or until the predetermined quantity of times. For example, the system may use a scoring function that is the linear combination of agreement and disagreement of source graphs in the bucket and, in some implementations, may account for the amount of new information in a bucket. New information may be the number of edges from only one source. The scoring may seek to maximize information gain. Accordingly, in some implementations, the system may calculate the information gain on various bucket splits and select the split configuration that maximizes the information gain. In some implementations, the system may calculate the score by subtracting the number of sources that do not agree on a particular predicate from the number of sources that do agree. The score may be a combination of the scores for the various predicates. In some implementations the information gain may be based on these scores. In another example, the score may account for the strength of the edges. For example, the system may calculate a strength of the edges that agree and divide that by the number of agreeing edges. This score may be the positive score. The system may also calculate a negative score that represents the strength of the edges that disagree divided by the number of edges that disagree. The system may calculate the bucket score by subtracting the negative score from the positive score. The strength of an edge may be a function of the number of sources associated with the edge (e.g. the provenance), and may include weighting according to the authority/accuracy of the source.

Figure 5:
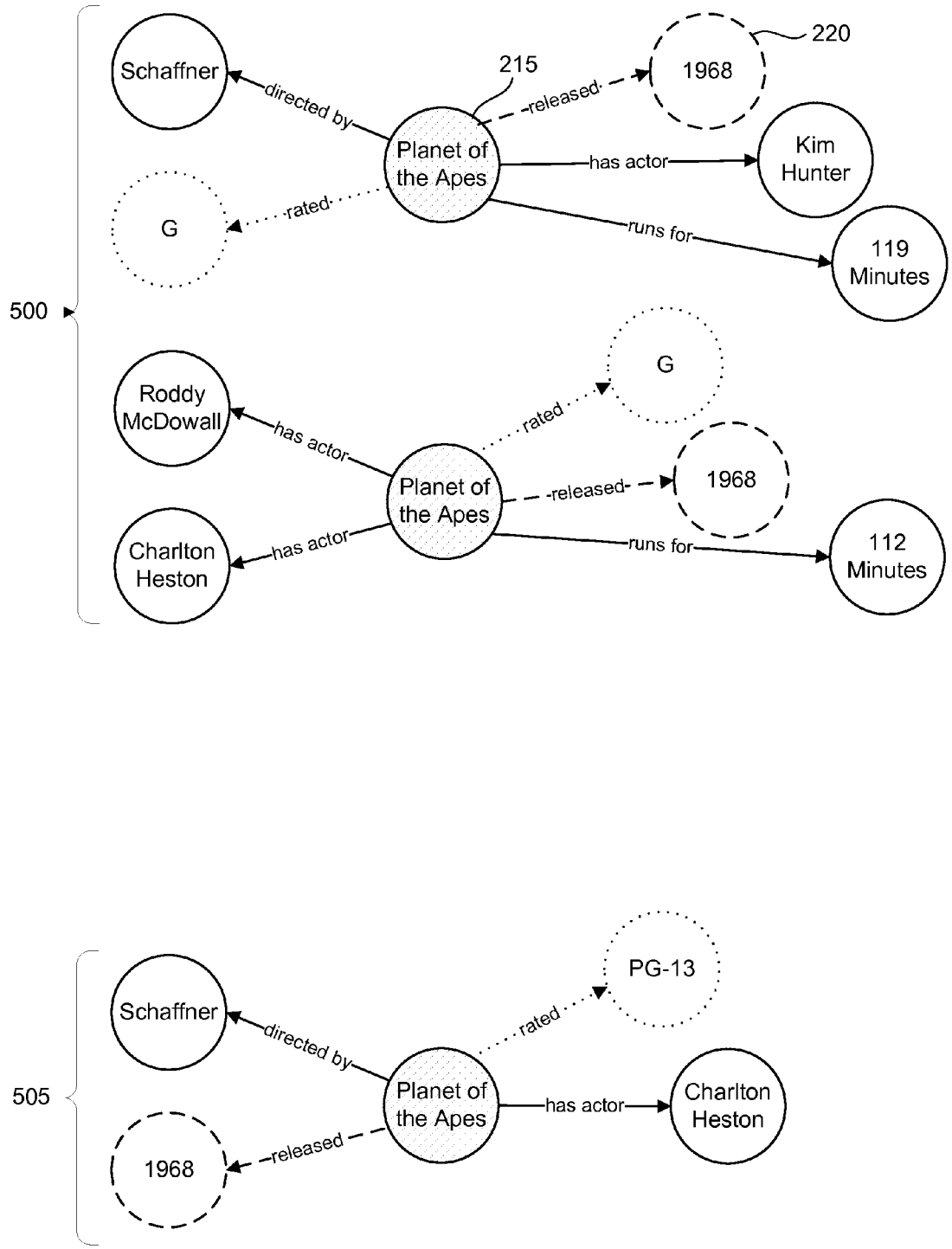
FIG. 5 illustrates further splitting the cluster of source data graphs using another determinative relationship, in accordance with disclosed implementations.

If the system has not completed the iterations (240, No), the system may select another, unselected discriminate predicate from the cluster (245) and repeat steps 230 and 235, further splitting the buckets. FIG. 5 illustrates an example of further splitting bucket 400 using the rated discriminate predicate. As illustrated, one source data graph has a tuple of <Planet of the Apes, rated, PG-13> and is placed in bucket 505 while two others have the tuple of <Planet of the Apes, rated, G> and are placed in bucket 500.

The system may determine whether the buckets 505 and 500 meet a reliability threshold, as discussed above, and discard any that do not.

Returning to FIG. 2, if the system has finished splitting the buckets (240, Yes), the system may remove conflicting discriminative facts and merge the source data graphs in the buckets to generate a reconciled data graph (250). The system may identify conflicting facts by comparing the objects of discriminative predicates. If one source graph in the bucket has a first object for a discriminative predicate and another source graph in the bucket has a second object for the same discriminative predicate, the system may determine the facts conflict. For example, in FIG. 5, the runs for predicate is discriminative because a movie should only have one running time. The system may determine that the two graphs in bucket 500 include a conflicting fact and may discard the bucket or may discard the conflicting facts. For example, the system may remove the tuple <Planet of the Apes, runs for, 119> from the first source data graph and the tuple <Planet of the Apes, runs for, 112> from the second source data graph. In another implementation the system may discard the entire contents of the bucket 500 as unreliable. In some implementations, the system may also discard buckets that have the same objects for different predicates. The predicate metadata may include metadata indicating which predicates support sharing the same object. For example, the predicates date of death and date of burial may have the same month. As another example, a founder of a company and the CEO of a company may also share the same value. But the predicates opened and established may not share the same value. The system may inspect the source graphs for matching objects and, if found, may determine whether the predicates support sharing the same value. If the predicate metadata indicates the predicates do not support sharing the same object the system may reject the bucket as not meeting the reliability threshold or may remove the two tuples with the predicates that do not allow sharing a value.

Figure 6:
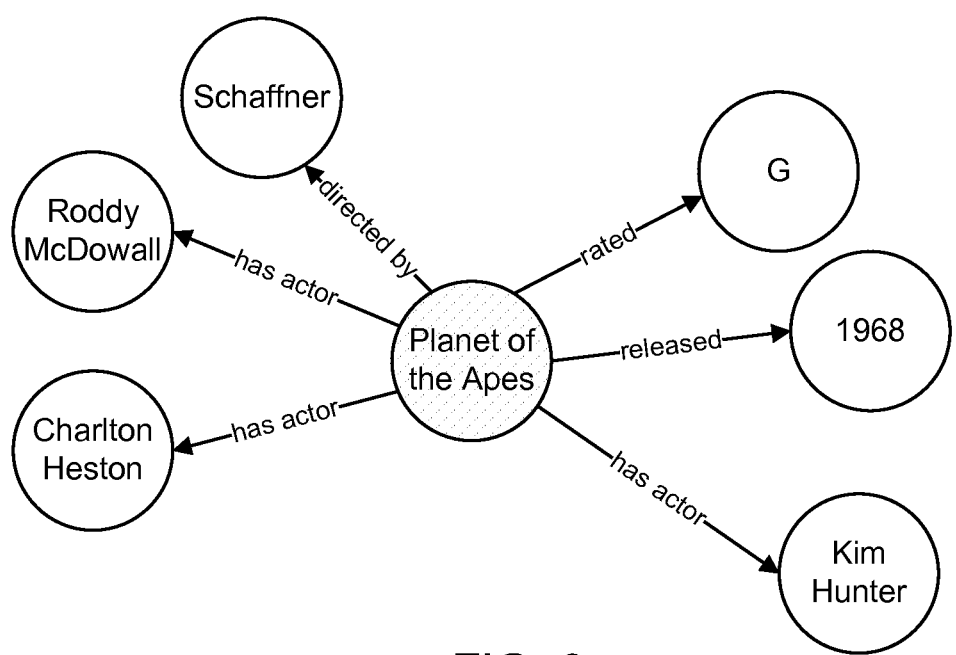
FIG. 6 illustrates an example of a reconciled data graph generated from source data graphs that share a quantity of facts, in accordance with disclosed implementations.

The system may then merge the source data graphs in the remaining buckets, generating a reconciled data graph for each bucket. Thus, the system may generate a reconciled data graph for each bucket that met the reliability threshold. FIG. 6 illustrates a reconciled graph generated from bucket 500 of FIG. 5. As illustrated, the reconciled graph merges the source data graphs on the source entity, in this example the Planet of the Apes entity. Also as illustrated, conflicting facts may be dropped from the reconciled graph, if the system does not drop the bucket because of the conflicting facts. FIG. 6 also illustrates that the reconciled graph includes many facts related to the potential new entity Planet of the Apes. In some implementations, the system may determine whether the source entity exists in the target data graph, and if it does may offer facts not already in the target data graph as potentially new facts for the target data graph. The reconciled data graph may retain the provenance information from the source data graphs. Thus, for example, the reconciled data graph may indicate that a particular edge linking the source entity to an object entity originated in a variety of different documents. This information may be used by a human evaluator to determine the trustworthiness of a particular fact, as edges from a variety of sources may have greater weight than edges from a few sources.

If there are other clusters to process, e.g., other source entity types and names (255, Yes), the system may repeat steps 220 to 250 for the additional clusters. Thus, the system may generate many reconciled graphs, each one being associated with a different source entity. When all clusters have been broken down into buckets and reconciled graphs generated (255, No), the system may attempt to merge reconciled graphs with sufficiently common properties (260). For example, the system may have generated a reconciled graph for a Barack Obama entity and for a 44$^{th}$ President entity. These entities do not have the same name and therefore the system would not cluster them together. However, the facts represented in the corresponding reconciled graphs may indicate sufficient similarity indicating that the two entities are the same entity and should be merged.

Figure 7:
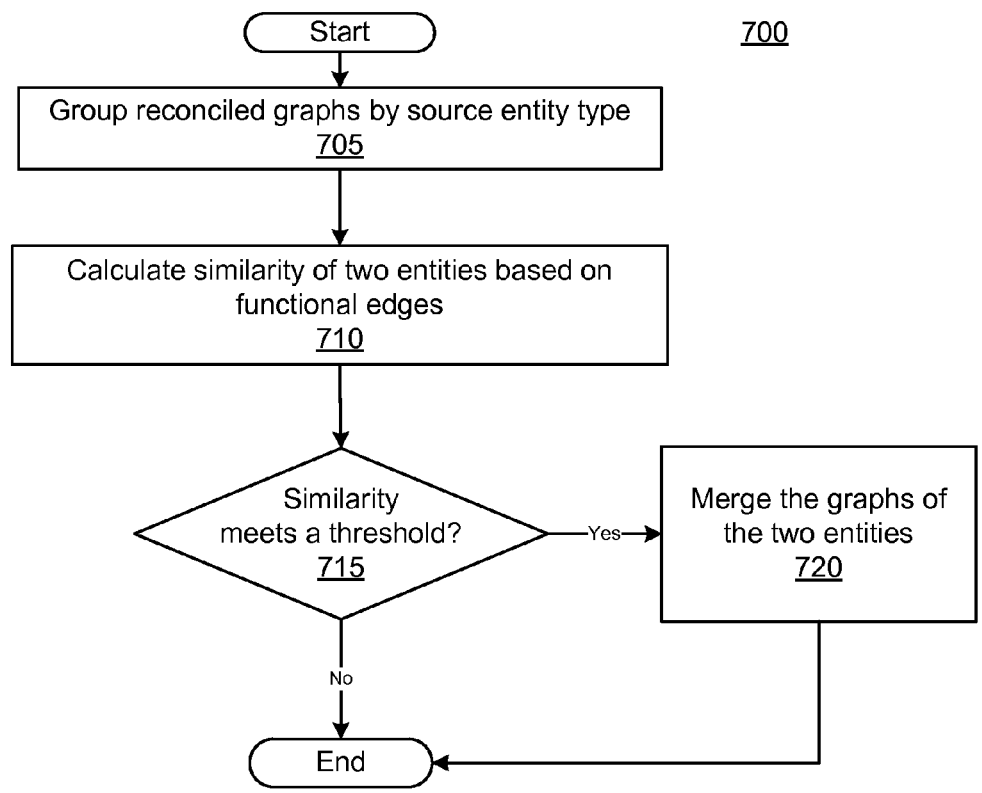
FIG. 7 illustrates a flow diagram of an example process for merging reconciled data graphs, in accordance with disclosed implementations.

FIG. 7 illustrates a flow diagram of an example process 700 for determining whether to merge reconciliation graphs based on similar characteristics. Process 700 may be performed by an entity discovery system, such as system 100 of FIG. 1, as part of step 260 of FIG. 1. Process 700 may begin with the system grouping the reconciled graphs by source entity type (705). For example, the system may group all reconciled graphs for movies together, all reconciled graphs for people together, etc. In some implementations, the system may use a single pass clustering process. The system may calculate the similarity of reconciled graphs of the same entity type (710). In one example, the system may use only determinative predicates to determine similarity. In one implementation, the system may determine similarity by determining the Jaccard similarity of the determinative predicates. For example, if a first reconciled data graph includes the determinative predicate-object pairs in set F1, and a second reconciled data graph includes the determinative predicate-object pairs in set F2, the system may compute the Jaccard similarity according to the formula $$J_{F1,F2} = \frac{|F1 \cap F2|}{|F1 \cup F2|}.$$

If the similarity of the determinative predicate-object pairs meets a similarity threshold (715, Yes), the system may merge the reconciled graphs on the source entity (720). When all sufficiently similar reconciled graphs have been merged, process 700 may then end.

Returning to FIG. 2, the reconciled graphs generated using process 200 may represent candidate entities that can be added to the target data graph. Because the reconciled graphs represent entities and facts from multiple unrelated sources, the quality of the entities and the facts for the entities may be of high quality. These candidate entities and their facts may be presented to a human evaluator who may flag them for addition to the target data store. If flagged for addition to the target data store, the system may easily incorporate the entities and their associated facts because they have a format used by the target data graph, e.g. in tuple form, and have been verified for quality and accuracy. In addition to finding new entities to complete the target data graph from older documents, process 200 may be used to identify new entities referenced in the news, e.g., on various news websites, that did not exist before. Furthermore, the system identifies not only a candidate entity, but also facts about the entity which make the target data graph more complete. The more quickly these candidate entities and their facts are identified, the more useful the target data graph becomes for generating search results for queries.

FIG. 8 shows an example of a generic computer device 800, which may be operated as system 100, and/or client 170 of FIG. 1, which may be used with the techniques described here. Computing device 800 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a personal computer such as a laptop computer 822, or smart phone 836. An entire system may be made up of multiple computing devices 800 communicating with each other. Other configurations are possible.

FIG. 9 shows an example of a generic computer device 900, which may be system 100 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-952n and 962a-962n. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-952n. Data structures, such as an index, may be stored, for example, across storage 956 and memory 954. Computing device 900 may include other components not shown, such as controllers, buses, input/output devices, communications modules, etc.

An entire system, such as system 100, may be made up of multiple computing devices 900 communicating with each other. For example, device 980a may communicate with devices 980*b*, 980*c*, and 980*d*, and these may collectively be known as system 100. As another example, system 100 of FIG. 1 may include one or more computing devices 900. Some of the computing devices may be located geographically close to each other, and others may be located geographically distant. The layout of system 900 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
    memory storing:
        a target data graph, and
        a plurality of source data graphs generated from analysis of source documents, where each source data graph:
            is associated with a source document having an associated domain,
            has a source entity that does not exist in the target data graph but has an entity type that exists in the target data graph, and
            includes fact tuples, where a fact tuple identifies:
                a subject entity,
                a relationship connecting the subject entity to an object entity, wherein the relationship is associated with the entity type of the subject entity in the target data graph, and
                the object entity;
    at least one processor; and
    memory storing instructions that, when executed by the at least one processor, cause the computer system to perform operations including:
        generating a cluster of source data graphs, the cluster including source data graphs associated with a first source entity of a first source entity type that shares at least two fact tuples that have the first source entity as the subject entity and a determinative relationship as the relationship connecting the subject entity to the object entity,
        iteratively splitting the source data graphs in the cluster into a plurality of buckets of the source data graphs based on a plurality of fact tuples, wherein each iteration operates on a distinct determinative relationship and each of the buckets for the iteration includes source data graphs that share a value for the fact tuple,
        discarding one or more buckets from the cluster that are associated with less than a minimum number of domains represented by the source data graphs in the cluster,
        generating a reconciled graph by merging the source data graphs remaining in the cluster when the source data graphs meet a similarity threshold, and
        generating a suggested new entity and entity relationships for the target data graph based on the reconciled graph.

2. The system of claim 1, wherein iteratively splitting the cluster into a plurality of buckets includes:
    splitting the cluster into first buckets based on a first of the plurality of fact tuples so that source data graphs sharing the first of the plurality of fact tuples are in a same first bucket; and,
    splitting, on the next iteration, the first buckets into second buckets based on a second of the plurality of fact tuples so that source data graphs sharing the second of the plurality of fact tuples are in a same second bucket.

3. The system of claim 1, wherein the minimum number depends on the number of domains represented by the source documents.

4. The system of claim 1, wherein the similarity threshold is based on a quantity of fact tuples for a first source data graph in the cluster that match fact tuples for a second source data graph in the cluster.

5. The system of claim 1, wherein the reconciled graph is a first reconciled graph and the memory stores instructions that, when executed by the at least one processor, causes the computer system to further perform operations including:
    generating a second reconciled graph from a second cluster for source data graphs associated with second subject entities of a second source entity type that share an entity name and that share object entities for at least two determinative relationships;
    determining that the first source entity type and the second source entity type are the same and that the first reconciled graph and the second reconciled graph meet the similarity threshold; and generating a third reconciled graph by merging the first reconciled graph and the second reconciled graph, wherein the suggested new entity and entity relationships are based on the third reconciled graph.

6. The system of claim 1, wherein the memory stores instructions that, when executed by the at least one processor, causes the computer system to further perform operations including:

discarding fact tuples representing conflicting facts from a particular source data graph prior to generating the cluster.

7. The system of claim 1, wherein the memory stores instructions that, when executed by the at least one processor, causes the computer system to further perform operations including:

generating inverse fact tuples for a particular source data graph prior to generating the cluster, the inverse fact tuples being a subset of the fact tuples included in the particular source data graph.

8. A method comprising:

generating, using at least one processor, a plurality of source data graphs, each source data graph being associated with a source document hosted at a domain and a source entity, the source data graph including tuples for the source entity, each tuple having a predicate linking the source entity to an object entity, wherein a target data graph lacks the source entity but an entity type of the source entity exists in the target data graph;

clustering, using the at least one processor, source data graphs by source entity name and source entity type;

dividing, using the at least one processor, the cluster into buckets of the source data graphs based on a plurality of fact tuples, wherein each of the plurality of fact tuples includes a subject entity name matching the source entity name and a distinct determinative relationship, where each bucket includes source data graphs that share the source entity name, the distinct determinative relationship, and an object entity for the distinct determinative relationship; and generating a candidate entity for the target data graph from at least some of the buckets, the candidate entity being from a first bucket that is associated with a minimum number of domains represented by the source data graphs in the first bucket.

9. The method of claim 8, wherein dividing the cluster into buckets includes:

selecting a determinative predicate from the tuples in the cluster;

generating a bucket for unique object entities for the determinative predicate, so that source data graphs with a first object entity for the determinative predicate are placed in a first bucket and source data graphs with a second object entity for the determinative predicate are placed in a second bucket; and repeating the selecting and generating on the generated buckets a quantity of times.

10. The method of claim 9, wherein dividing the cluster into buckets includes:

discarding buckets with less than the minimum number of different domains prior to repeating the selecting and generating.

11. The method of claim 10, wherein each source data graph includes at least one tuple with an object entity that exists in the target data graph.

12. The method of claim 10, wherein the minimum number depends on the number of domains represented by the source documents.

13. The method of claim 9, wherein after the dividing, for each bucket not discarded the method further comprises:

generating a reconciled graph from source data graphs in the bucket; and generating the candidate entity using the reconciled graph.

14. The method of claim 13, the method further comprising:

determining that a first source entity type of a first reconciled graph and a second source entity type of a second reconciled graph are the same and that the first reconciled graph and the second reconciled graph meet a similarity threshold; and generating a third reconciled graph by merging the first reconciled graph and the second reconciled graph, wherein the candidate entity is based on the third reconciled graph.

15. The method of claim 13, further comprising:

discarding fact tuples representing conflicting facts from the reconciled graphs prior to generating the candidate entity.

16. A method of automatically identifying new entities for a target data graph comprising:

generating, for each of a plurality of text documents, a source data graph for a potential entity from the text document in which the potential entity is identified, the source data graph representing the potential entity and facts about the potential entity from the text document and the text document being hosted at a domain, wherein the target data graph lacks the potential entity but an entity type of the potential entity exists in the target data graph;

clustering source data graphs by entity name and type, wherein at least one cluster is for the potential entity;

iteratively dividing the cluster into a plurality of buckets of source data graphs based on a plurality of fact tuples, wherein each of the plurality of fact tuples includes a subject entity matching the potential entity and a distinct determinative relationship;

verifying the potential entity using the cluster by:

corroborating at least a quantity of determinative facts about the potential entity, and determining the potential entity is included in a bucket associated with a minimum number of different domains represented by the source data graphs in the bucket after iteratively dividing the cluster; and storing the potential entity and the facts about the potential entity.

17. The method of claim 16, further comprising:

generating information that is presented to a user using the stored potential entity and the stored facts;

receiving input from the user indicating the potential entity and the stored facts are acceptable; and generating a new entity in a target data graph representing the potential entity; and generating relationships in the target data graph for the new entity that represent the stored facts.

18. The method of claim 16, wherein buckets lacking the minimum number of different domains are discarded during the iterative dividing.

19. The method of claim 16, further comprising: removing conflicting facts from the facts about the potential entity prior to storing the potential entity and the facts.

20. The method of claim 16, wherein the minimum number of different domains depends on the number of domains represented by the text documents.

21. The method of claim 16, wherein generating the source data graph includes:
- generating a plurality of facts from each of the plurality of text documents, the plurality of facts including the facts about the potential entity; and
- clustering the facts by text document, entity type, and entity name.

22. The method of claim 16, wherein verifying the potential entity further includes determining that at least one of the determinative facts has an object that exists in a target data graph.

23. The method of claim 16, wherein each source data graph includes at least one fact with an object entity that exists in the target data graph.

24. The system of claim 1, wherein each source data graph in the plurality of source data graphs includes at least one fact tuple having an object entity that exists in the target data graph.

\* \* \* \* \*

UNITED STATES PATENT AND TRADEMARK OFFICE
CERTIFICATE OF CORRECTION

PATENT NO. : 9,785,696 B1
APPLICATION NO. : 14/059830
DATED : October 10, 2017
INVENTOR(S) : Yakhnenko et al.

Page 1 of 1

It is certified that error appears in the above-identified patent and that said Letters Patent is hereby corrected as shown below:

In the Claims

In Column 16, Claim 2, Line 44, delete "and," and insert -- and --, therefor.

In Column 18, Claim 14, Lines 10-11, delete "the method further comprising:" and insert -- further comprising: --, therefor.

Signed and Sealed this
Tenth Day of April, 2018

Andrei Iancu
*Director of the United States Patent and Trademark Office*